United States Patent [19]
Blankenship et al.

[11] Patent Number: 5,726,684
[45] Date of Patent: Mar. 10, 1998

[54] DETACHABLE CONVERTIBLE MOUSE-TRACKBALL POINTING DEVICE FOR USE WITH A COMPUTER

[75] Inventors: Joseph H. Blankenship, Liberty; Ronald A. Rush, Jr., Columbia, both of S.C.

[73] Assignee: NCR Corporation, Dayton, Ohio

[21] Appl. No.: 686,856

[22] Filed: Jul. 26, 1996

[51] Int. Cl.$^6$ ............................. G09G 5/08; G06F 3/033
[52] U.S. Cl. .................... 345/167; 345/163; 364/709.01
[58] Field of Search ............................ 345/163, 167, 345/168, 169; 364/709.1, 708.1; D14/114

[56] References Cited

U.S. PATENT DOCUMENTS

| | | | |
|---|---|---|---|
| 4,939,508 | 7/1990 | Lawrence et al. | 345/163 |
| 5,049,863 | 9/1991 | Oka | 340/710 |
| 5,063,289 | 11/1991 | Jasinski et al. | 250/221 |
| 5,063,376 | 11/1991 | Chang | 340/706 |
| 5,126,955 | 6/1992 | Tomoda | 364/708 |
| 5,280,276 | 1/1994 | Kwok | 345/167 |
| 5,287,090 | 2/1994 | Grant | 345/163 |
| 5,379,054 | 1/1995 | Tanaka et al. | 345/163 |
| 5,473,346 | 12/1995 | Pollack | 345/169 |
| 5,546,334 | 8/1996 | Hsieh et al. | 345/167 |

Primary Examiner—Steven Saras
Assistant Examiner—David L. Lewis
Attorney, Agent, or Firm—Michael A. Kaufman

[57] ABSTRACT

A laptop computer includes a cavity into which a mouse/trackball pointer unit may be releasably mounted. The pointer unit is electrically coupled to the laptop computer by a retractable wire or by infrared or radio frequency wireless techniques, and is used as a trackball when disposed within the keyboard cavity. User-operable switches are accessible from the trackball surface of the unit. However, when work space permits, the pointer unit may be removed from the laptop cavity, inverted and used as a mouse. Additional user-operable switches are also accessible from the mouse upper-surface of the pointer unit. The pointer unit housing has a single opening through which the rotatable ball protrudes in each mode. A sense switch automatically ascertains which mode is to be used from the relative orientation of the pointer unit housing. In mouse mode, a sense switch decouples the trackball surface accessible user-operable switches to prevent their inadvertently signaling as the pointer unit is moved about. A pressure cap mechanism urges the trackball toward an opening in the trackball surface of the unit. A differential urging force may be applied to the trackball depending upon whether mouse mode or trackball mode operation is presently being used.

19 Claims, 5 Drawing Sheets

DETACHABLE CONVERTIBLE MOUSE-TRACKBALL POINTING DEVICE FOR USE WITH A COMPUTER

FIELD OF THE INVENTION

The invention relates to input devices for use with portable computers, and more specifically to convertible mouse-trackball pointing devices for use with portable digital computers.

BACKGROUND OF THE INVENTION

Mouse and trackball pointing devices are commonly used with desktop and portable digital computers to input user selections and information. Such uses include activation of menus, selection of menu choices, blocking text and moving text, as well as drawing and reshaping lines and objects.

Mice are well known in the art and include a ball that can rotate over two orthogonal axes as the mouse housing (or simply "mouse") is moved over a plane surface. As the mouse is moved by the computer user, the ball rotates causing x-axis and y-axis position sensors within the mouse to indicate the direction, displacement, and rate of ball movement. Typically, ball movement frictionally rotates x-axis and y-axis members, whose rotation is sensed using optical encoders. The encoders output a digital signal that is coupled to a microprocessor unit within the mouse that computes coordinate and velocity data. This data is then coupled to a computer through a cable, or, in wireless fashion, using infra-red ("IR") or radio frequency ("RF") energy. In response to this data, circuitry within the computer causes the cursor on the computer display to move. Cursor movement tracks the mouse movement, and the cursor moves in the same direction and with a velocity proportional to movement of the mouse. In a drawing program, for example, mouse motion can reposition the cursor so as to draw or reshape an object, in addition to making menu selections.

For desktop computer users, there are no serious drawbacks associated with the use of a mouse. But while mice are convenient to use, they do require several square inches of flat surface over which they are rolled by the user. For portable computers such as laptops, mice can be very useful, but such computers are often used in environments in which flat space over which to operate a mice is at a premium. For example, it can be difficult to use a mouse on an airline food tray in the small area that is available when a laptop computer is placed on the tray.

Alternatively, trackball devices are also known in the art for use with computers. A trackball is somewhat analogous to an upside down mouse, in which a trackball protrudes from an uppermost surface of the device. The trackball is rotated by a user's hand while the trackball housing remains stationary. As the trackball rotates, x-axis and y-axis position information is generated such that the trackball outputs a signal that moves the cursor on the computer display. Because the trackball housing remains stationary, trackball devices require relatively little surface area for use. Trackballs have become especially popular with laptop computer users, and frequently are built into the laptop keyboard area. As such, a trackball-equipped laptop computer requires no extra surface area. However, for some applications, a user may prefer using a mouse. In drawing programs, for example, a mouse can often be used more rapidly than a trackball in drawing images.

Combined mouse-trackball pointing devices are known in the art. U.S. Pat. No. 5,063,289 to Jasinski discloses one such device in which the unit is provided with a hinged cover that can be retracted or extended to help change from mouse to trackball mode. Jasinski's hinged construction appears to make his unit somewhat unsuitable for inclusion within a laptop computer keyboard, and further requires the user to unhinge the unit in changing modes. U.S. Pat. No. 5,280,276 to Kwok discloses a combined mouse-trackball unit in which a user-operated handle is activated to convert the unit from mouse to trackball mode. However, Kwok's mechanism requires the ball to project through the upper or lower housing surface, depending upon the mode of use, and does not appear to lend itself to inclusion within the keyboard of a laptop computer.

In short, there is a need for a built-in pointing device on a laptop computer that combines the best features of a mouse and a trackball, and that may be converted from a mouse to a trackball and vice versa. Such a unit should be stored within the keyboard for use as a trackball, but should be readily removable for use as a mouse.

The present invention provides such a pointing device.

SUMMARY OF THE PRESENT INVENTION

The present invention provides a laptop computer with a mouse/trackball pointer unit that is releasably mountable within a cavity on the laptop keyboard. Coupled to the laptop computer by a retractable wire or by infrared or radio frequency wireless techniques, the pointer unit is used as a trackball when disposed within the keyboard cavity. User-operable switches are accessible from the trackball surface of the unit. However, when work space permits, the pointer unit may be removed from the laptop cavity, inverted and used as a mouse. Additional user-operable switches are also accessible from the mouse upper-surface of the pointer unit.

The pointer unit housing has one opening through which the rotatable ball protrudes, regardless of whether mouse mode or trackball mode is to be used. One or more sense switches automatically ascertains which mode is to be used from the relative orientation of the pointer unit housing. In the mouse mode, a sense switch decouples the trackball surface accessible user-operable switches to prevent their inadvertently signaling as the pointer unit is moved about.

A pressure cap mechanism urges the trackball toward an opening in the trackball surface of the unit. A differential urging force may be applied to the trackball depending upon whether mouse mode or trackball mode operation is presently being used. Such differential urging force may be manually switched by a user-controlled lever, or may be automatically invoked using a sense switch that couples or decouples electrical operating potential to a solenoid coupled to a ball repositioning member.

Other features and advantages of the invention will appear from the following description in which a preferred embodiment has been set forth in detail in conjunction with the accompanying drawings.

DETAILED DESCRIPTION OF THE PREFERRED EMBODIMENTS

Figure 1:
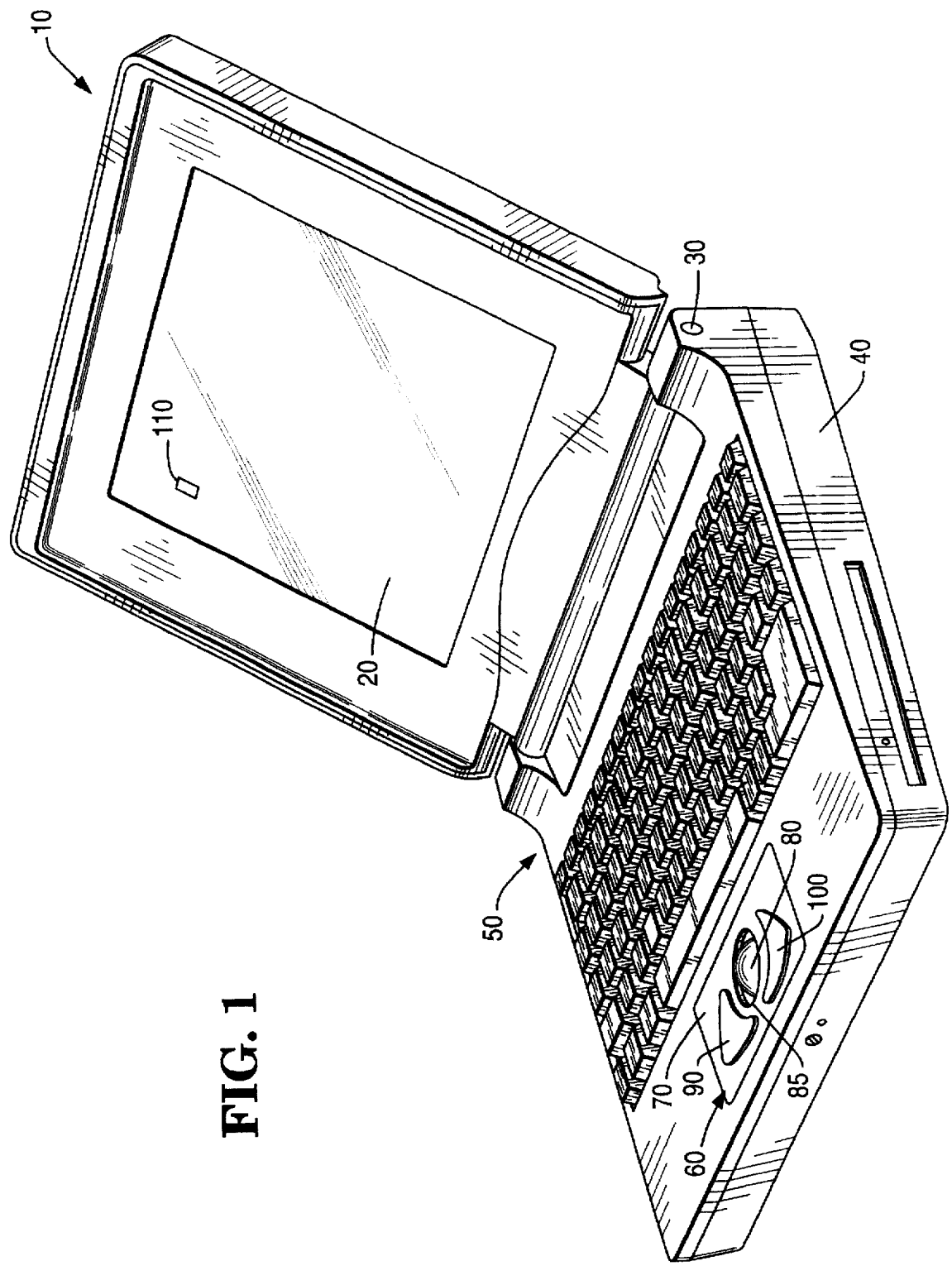
FIG. 1 depicts a mobile computer equipped with a convertible mouse/trackball pointing device, according to the present invention.

FIG. 1 depicts a laptop computer 10 that includes a typically liquid crystal display ("LCD") 20 portion attached by a hinge mechanism 30 to a lower computer portion 40 that includes switches and operator keys 50 and a convertible mouse/trackball pointing unit 60, according to the present invention. Typically within lower portion 40, computer 10 includes a central processor unit ("CPU"), persistent and volatile memory, and a battery power supply.

Pointing unit 60 has an upper housing portion 70 from which a spherical trackball 80 protrudes through a circular opening 85. First and second user-operable switches 90, 100 are positioned for operation on housing portion 70, and preferably protrude through openings 95, 105 in the housing portion. As trackball 80 is moved by the user's hand, the cursor 110 on LCD 20 moves accordingly. Switches 90 and 100 can enable the user to activate or deactivate operation of pointing unit 60. The nomenclature "90, 100" will refer both to the switching mechanisms themselves, and to the protruding depressible surface that a user presses against to activate the switch.

Figure 2:
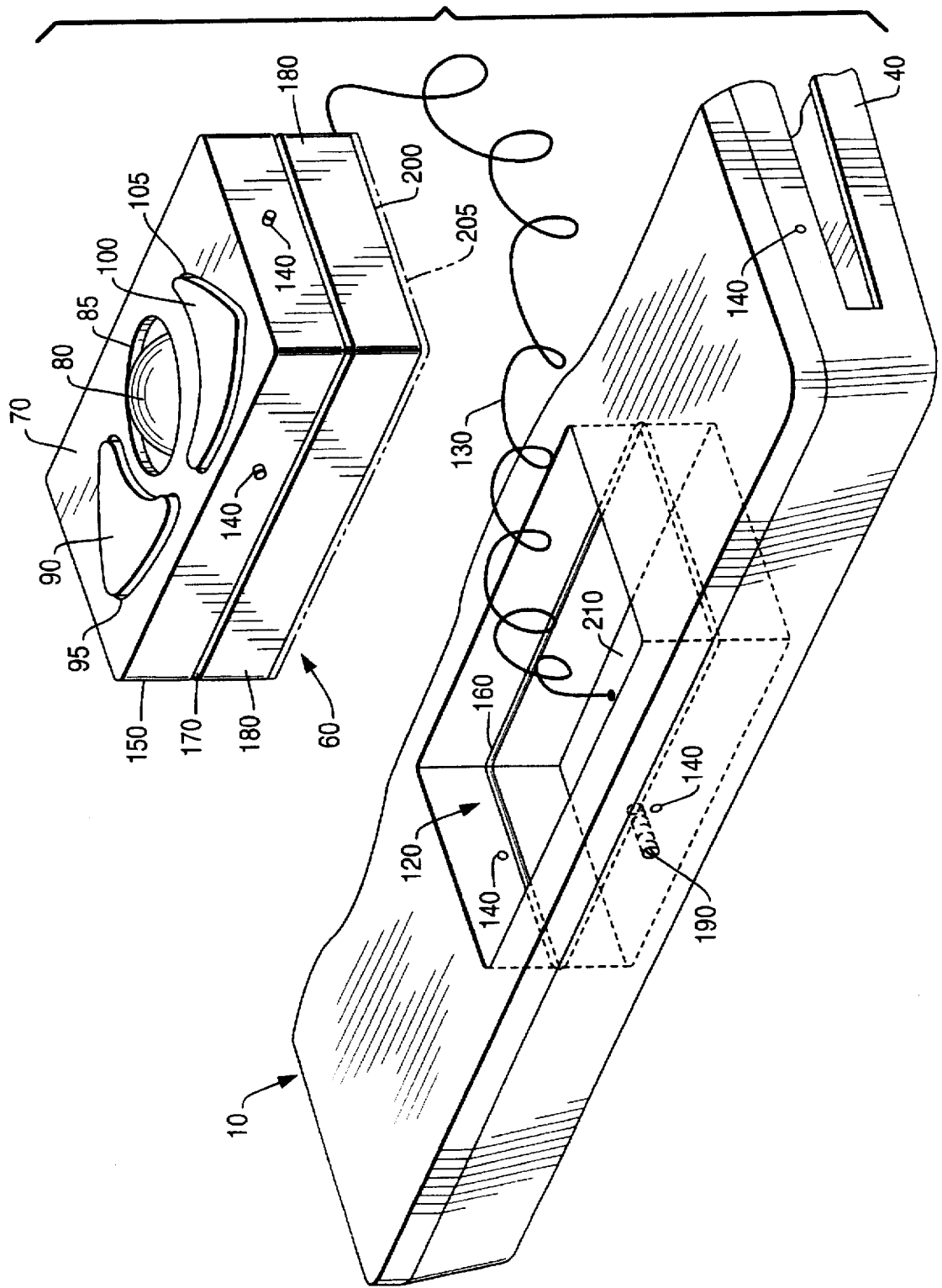
FIG. 2 depicts the mouse/trackball pointing device of FIG. 1 removed from the laptop computer.

FIG. 2 depicts pointer unit 60 removed from cavity 120 in lower portion 40 of computer 10. In general, the housing perimeter of unit 60 is substantially free of projections or indentations that might interfere with the insertion or withdrawal of unit 60 from cavity 120.

In the embodiment shown, electrical connections between pointer unit 60 and computer 10 are made using a self-retracting cable 130. Alternatively, signals between pointer unit 60 and computer 10 could be made coupled using wireless techniques, including infrared ("IR"), and radio frequency ("RF") transmission. In a wireless embodiment, send/receive transducers 140 would be disposed at locations that included a location within cavity 120 (for transmission when unit 60 is used while docked within the cavity), as well as locations on preferably at least two surfaces of the computer 10. Similarly, one or more transducers 140 would be mounted on the housing 150 of unit 60.

When unit 60 is used as a trackball, the unit may most conveniently be retained within cavity 120, as shown in FIG. 1, although trackball operation could occur with unit 60 removed from cavity 120 as shown in FIG. 2. Several techniques may be used to removably retain unit 60 within cavity 120. For example, a biased detent mechanism 160 within cavity 120 may frictionally engage a detent-shaped groove 170 in the sidewalls 180 of unit 60. A biased release mechanism 190, when depressed by a user releases the detent mechanism 160 from groove 170, permitting unit 60 to be lifted out of cavity 120.

Alternatively, the lower surface 200 of unit 60 could include an embedded or painted metal plate 205 that is held within cavity 120 by a magnetic plate 210 at the bottom surface of cavity 120. Of course, the field produced by such a magnetic plate must not be so large as to interfere with persistent storage devices within or adjacent computer 10.

Figure 3:
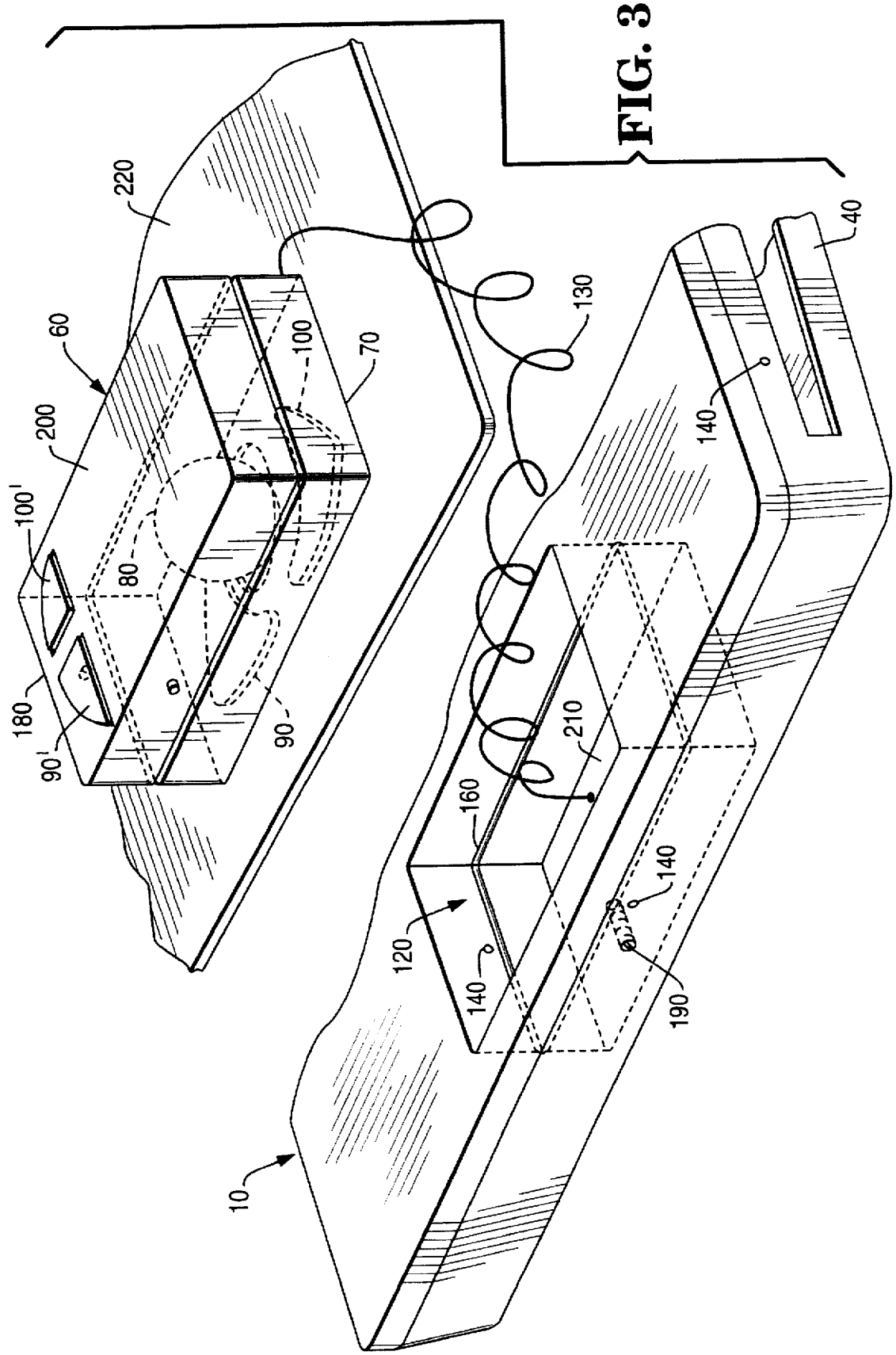
FIG. 3 depicts the mouse/trackball pointing device of FIG. 2 inverted for use as a mouse.

FIG. 3 depicts unit 60 inverted (relative to FIGS. 1 and 2), and deployed for use as a mouse atop an optional mouse-type pad 220. To minimize any drag, preferably the outer surfaces of switches 90 and 100 are a smooth material and, as noted, these surfaces can retract within the surrounding openings 95, 105.

The now upper surface 200 of pointer unit 60 is provided with at least one and preferably two user-operable switches 90' and 100". Electrically, switch 90' may be coupled in parallel with switch 90, and switch 100' may be coupled in parallel with switch 100. Because a somewhat rectangular shape is preferred for a mouse unit, switches 90' and 100' are disposed near a narrower rather than a wider side 180. As such, there is no requirement that switches 90', 100' on surface 200 physically overlie switches 90 and 100 on surface 70. In fact, in the embodiment shown, there is a 90° rotation between the two sets of switches.

Figure 4:
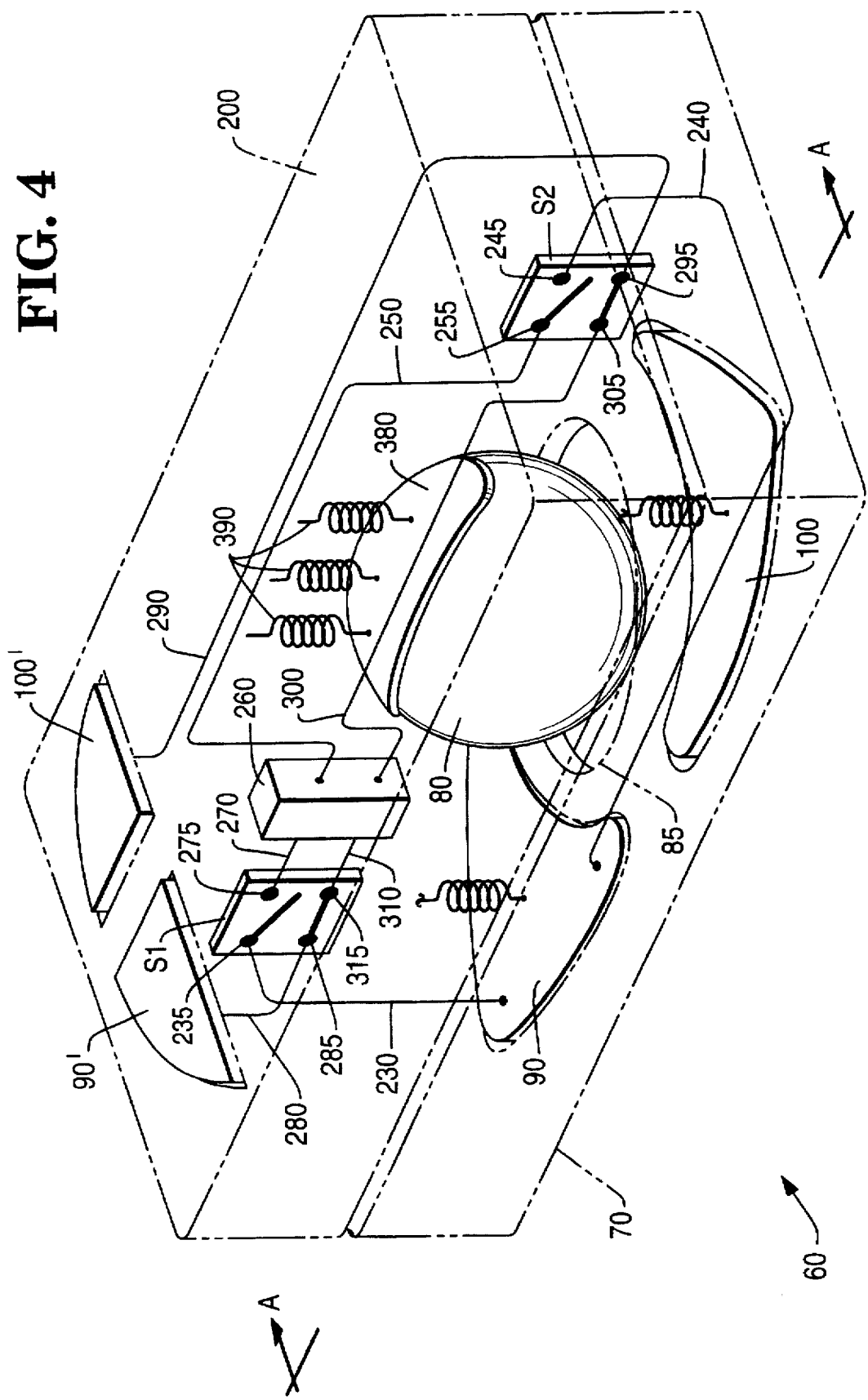
FIG. 4 is a partial cutaway perspective view of the mouse/trackball device of FIG. 3.

In the partial cutaway view of FIG. 4, two sense switches S1 and S2 are shown. By "sense switch" it is meant that switch S1 and S2 can sense whether surface 200 is uppermost, in which case unit 60 is in a mouse mode, or whether surface 70 is uppermost, in which case unit 60 is in a trackball mode. Switches S1 and S2 may be implemented in several ways, including using mercury switches, Hall-effect type devices, and the like.

In FIG. 4, wire 230 from trackball switch 90 goes to terminal 235 of switch S1, and wire 240 from trackball switch 90 goes to terminal 245 of switch S2. Wire 250 is coupled from terminal 255 of switch S2 to switch sense circuitry 260, and wire 270 is coupled from terminal 275 of switch S1 to circuitry 260. However, in the orientation shown, no electrical contact is made between terminals 235 and 275 on switch S1, or between terminals 245 and 255 of switch S2, because the mercury is at the bottom of the respective switches. (By contrast, if unit 60 in FIG. 4 were inverted into trackball position, mercury within switch S1 would coupled together terminals 235 and 275, and mercury within switch S2 would couple together terminals 245 and 255.) Thus, in the mouse configuration shown in FIG. 4, sense switches S1 and S2 decouple trackball switches 90 and 100 from circuit 260.

Consider now the operative and functional action of mouse switches 90' and 100'. As shown in FIG. 4, switch 90' is connected by wire 280 to terminal 285 of switch S1, and switch 100' is connected by wire 290 to terminal 295 of switch S2. Wire 300 connects terminal 305 of switch S2 to circuitry 260, and wire 310 connects terminal 315 of switch S1 to circuitry 260. In the mouse mode configuration shown, mercury within switches S1 and S2 is at the bottom of each switch, and terminals 285 and 315 on switch S1, and terminals 295 and 305 on switch S2 are coupled together. Thus, in the configuration shown in FIG. 4, although the trackball switches 90, 100 are decoupled from circuitry 260 by the sense switches S1, and S2, the mouse switches 90' and 100' are coupled to circuitry 260.

From the foregoing, it will be appreciated that sense switches S1, S2 prevent any mouse movement of unit 60 from depressing either of switches 90 or 100 such that switch activation is registered within circuitry 260. Thus, in sliding unit 60 leftward, for example, even if switch 90 should be depressed, perhaps by the underlying table top or mouse pad, no electrical action results because sense switch S1 decouples switch 90 when unit 60 is in the mouse mode.

Figure 5:
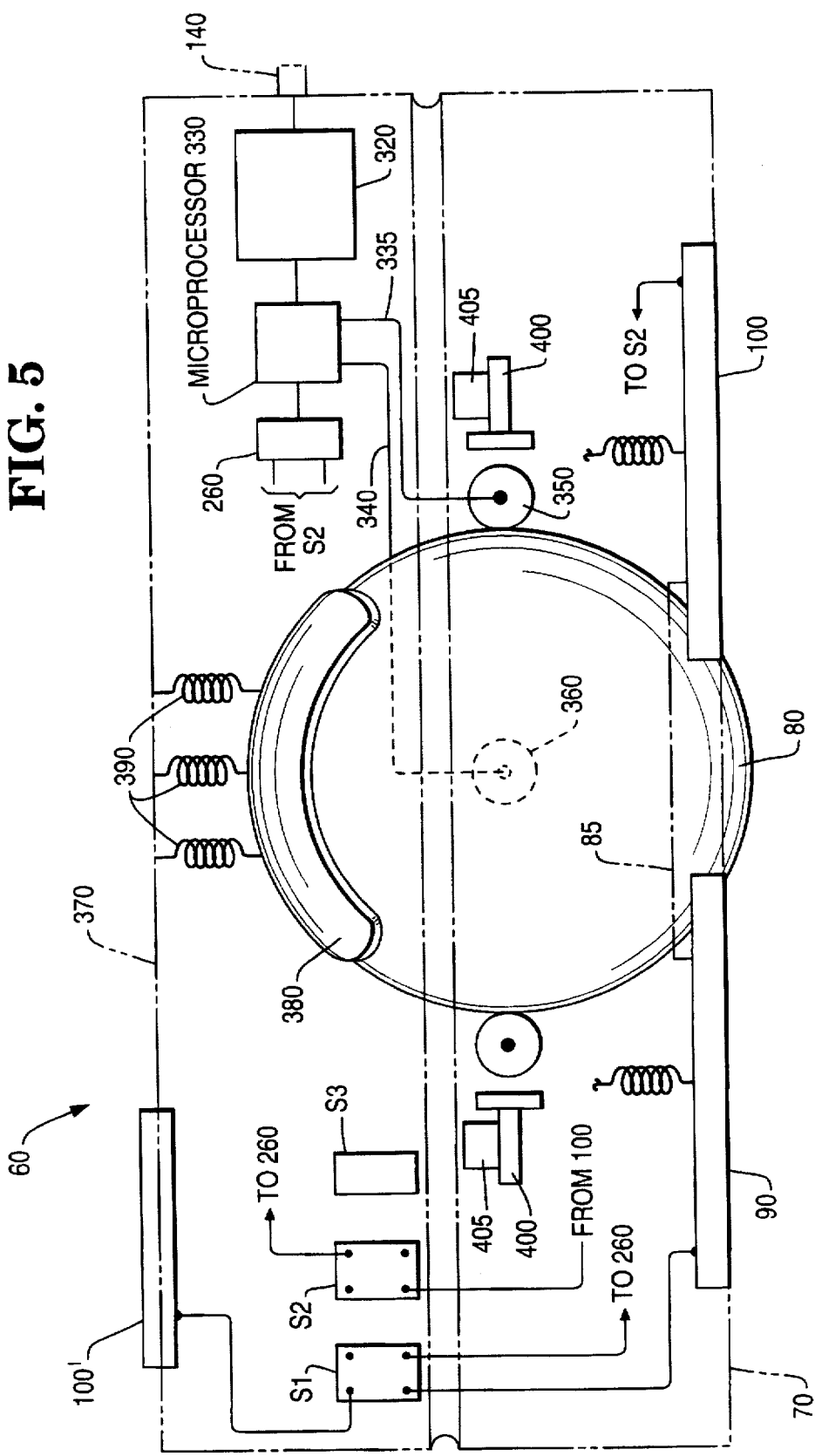
FIG. 5 is a sideview of the mouse/trackball pointing device of FIG. 4, taken along section line A—A.

FIG. 5 is a sectioned sideview of unit 60, and shows an embodiment of unit 60 that includes a wireless module 320 coupled to transducers 140 as well as to a microprocessor unit 330. Microprocessor 330 is also coupled by wires 335, 340 to x-axis and y-axis position indicators 350, 360. As is known in the art, indicators 350, 360 output positional information at a rate proportional to movement of ball 80. Microprocessor unit 330 processes this information, which it provides to the host computer either through a cable (e.g., cable 130 in FIG. 1), or through a wireless mechanism, such as module 320 and transducers 140.

In contrast to prior art convertible devices such as that disclosed by Jasinski, the present invention includes a non-hinging housing 370 that, unlike the housing disclosed by Kwok, provides but a single opening 85 for the ball 80. A pressure cap 380 urges ball 80 into opening 85, through the use of springs 390 or similar mechanical biasing devices. Pressure cap 380 has the shape of a fraction of a hollow sphere and is sized to overlie a fraction of the ball 80. To minimize friction with ball 80, the concave inner surface of cap 380 is preferably a smooth, relatively frictionless material, such as Teflon™ material, nylon, or the like.

In trackball mode, cap 380 and springs 390 should exert sufficient upward force to maintain at least a portion of ball 80 within opening 85, as opposed to allowing gravity to permit the weight of ball 80 to cause ball 80 to fall too far into the interior of housing 370.

If desired, a bimodal ball repositioning member may be used in lieu of biased cap 380. By "bimodal" it is meant that in the mouse configuration shown in FIG. 5, the repositioning member should exert a first magnitude of bias force, and in the trackball configuration of FIG. 2, the repositioning member should exert a second, greater, magnitude of bias force. Such repositioning could be manually invoked, with a user-operable lever that preferably does not substantially disturb the perimeter outline of unit 60. Such a repositioning member is shown generically as element 400 in FIG. 5.

Alternatively, in a configuration in which a cable is used (e.g., see FIGS. 2 and 3), electrical energy from the host computer could be used to latch or unlatch a solenoid 405 that would automatically reposition the repositioning member 400. A sense switch S3, similar to switches S1, S2, could be used to automatically determine which of surfaces 70 or 200 is uppermost (e.g., whether trackball or mouse mode is presently used). Depending upon the sensed mode, the switch would electrically couple or decouple operating voltage to a latch-type solenoid 405 coupled to the repositioning member 400.

The preferred embodiment has been described with respect to use with a laptop computer. However, it will be appreciated that a suitable cavity 120 could be provided in a standard desktop-type keyboard, and that a single unit 60 could be used to provide trackball/mouse mode operation with a desktop computer, rather than for a laptop computer.

Modifications and variations may be made to the disclosed embodiments without departing from the subject and spirit of the invention as defined by the following claims.

What is claimed is:

1. A convertible mouse-trackball pointing device for use with a computer, comprising:
  a device housing having at least spaced-apart first and second surfaces, said first surfacing defining a circular opening;
  a ball, rotatably mounted within said housing such that a portion of said ball protrudes through said circular opening;
  means, disposed within said device housing, for biasedly urging said ball toward said circular opening;
  positioning sensing components, mounted within said housing as to be frictionally rotated by rotation of said ball about either of two orthogonal axes;
  process circuitry, disposed within said device housing, coupled to said sensing components for outputting electrical signals, coupleable to a host computer, containing position coordinate information representing rotation of said ball;
  at least a first user-operable switch, coupled to said process circuitry and operable from said first surface of said housing;
  at least a second user-operable switch, coupled to said process circuitry and operable from said second surface of said housing;
  sense switch means, coupled to said housing and to said at least first user-operable switch and to said at least second user-operable switch, for detecting which of said first and second surfaces is oriented uppermost and for decoupling a chosen one of said at least first user-operable switch and said at least second user-operable switch from said process circuitry as a function of orientation of said housing;
  wherein when said first surface is oriented uppermost, said device is useable as a trackball, and said at least second user-operable switch is decoupled from said process circuitry; and
  wherein when said second surface is oriented uppermost, said device is usable as a mouse, and said at least first user-operable switch is decoupled from said process circuitry.

2. The device of claim 1, wherein said first and second surfaces are immovable relative to each other.

3. The device of claim 1, wherein said sense switch means includes a mercury switch.

4. The device of claim 1, wherein said sense switch means includes a Hall-effect device.

5. The device of claim 1, further including:
  a concave-shaped segment of a sphere, sized to overlie a portion of said ball; and
  means for biasedly urging said ball toward said circular opening.

6. The device of claim 1, further including a ball repositioning member, disposed within said housing and coupled to said ball such that when said device is usable as a trackball, said repositioning member urges said ball toward said circular opening with greater force than when said device is usable as a mouse.

7. The device of claim 6, further including:
  a solenoid, attached to an interior portion of said housing and mechanically coupled to said repositioning member; and
  a sense switch, attached to an interior portion of said housing and coupled to provide said solenoid with operating potential when said device is in a chosen one orientation selected from the group consisting of said device being useable as a mouse and said device being useable as a trackball.

8. The device of claim 1, further including wireless transmission means, attached to said housing and electrically coupled to said processor circuitry, for transmitting to a host computer positional data for said ball.

9. The device of claim 8, wherein said wireless transmission means includes at least one device selected from the group consisting of (i) an infrared transmitter, and (ii) a radio frequency transmitter.

10. For use with a laptop computer that includes a keyboard, that may be stationary at all times relative to the laptop computer, defining a cavity accessible from an upper surface, a convertible mouse-trackball pointing device, comprising:
  a device housing having at least spaced-apart first and second surfaces, said first surfacing defining a circular opening, said device sized to fit within said cavity;
  retaining means, attached to said housing, for releasably retaining said device within said cavity of said keyboard;

a ball, rotatably mounted within said housing such that a portion of said ball protrudes through said circular opening;

positioning sensing components, mounted within said housing as to be frictionally rotated by rotation of said ball about either of two orthogonal axes;

process circuitry, disposed within said device housing, coupled to said sensing components for outputting electrical signals, coupleable to a host computer, containing position coordinate information representing rotation of said ball;

means for coupling said information representing rotation of said ball from said device to said computer;

at least a first user-operable switch, coupled to said process circuitry and operable from said first surface of said housing;

at least a second user-operable switch, coupled to said process circuitry and operable from said second surface of said housing; and sense switch means, coupled to said housing and to said at least first user-operable switch and to said at least second user-operable switch, for detecting which of said first and second surfaces is oriented uppermost and for decoupling a chosen one of said at least first user-operable switch and said at least second user-operable switch from said process circuitry as a function of orientation of said housing;

wherein when said first surface is oriented uppermost, said device is useable as a trackball even when said device is retained within said cavity, and said at least second user-operable switch is decoupled from said process circuitry; and wherein when said second surface is oriented uppermost, said device is usable as a mouse, and said at least first user-operable switch is decoupled from said process circuitry.

11. The device of claim 10, wherein said first and second surfaces are immovable relative to each other.

12. The device of claim 10, wherein said sense switch means includes at least one device selected from the group consisting of (i) a mercury switch, and (ii) a Hall-effect device.

13. The device of claim 10, further including means, coupled within said device, for biasedly urging said ball toward said circular opening.

14. The device of claim 10, further including:

a concave-shaped segment of a sphere, sized to overlie a portion of said ball; and means for biasedly urging said ball toward said circular opening.

15. The device of claim 10, further including a ball repositioning member, disposed within said housing and coupled to said ball such that when said device is usable as a trackball, said repositioning member urges said ball toward said circular opening with greater force than when said device is usable as a mouse.

16. The device of claim 15, further including:

a solenoid, attached to an interior portion of said housing and mechanically coupled to said repositioning member; and a sense switch, attached to an interior portion of said housing and coupled to provide said solenoid with operating potential when said device is in a chosen one orientation selected from the group consisting of said device being useable as a mouse and said device being useable as a trackball.

17. The device of claim 10, wherein said means for coupling includes at least one device selected from the group consisting of (i) an infrared transmitter, and (ii) a radio frequency transmitter.

18. The device of claim 10, wherein said means for coupling includes a self-retracting cable.

19. A laptop computer with a detachable convertible mouse-trackball pointing device, comprising:

a laptop computer whose keyboard may be stationary at all times relative to the laptop computer and whose keyboard area defines a cavity accessible from an upper surface;

a convertible mouse-trackball pointing device, sized to fit removably within said cavity, said device comprising:

a device housing having at least spaced-apart first and second surfaces, said first surfacing defining a circular opening, said device sized to fit within said cavity;

retaining means, attached to said housing, for releasably retaining said device within said cavity of said keyboard;

a ball, rotatably mounted within said housing such that a portion of said ball protrudes through said circular opening;

positioning sensing components, mounted within said housing as to be frictionally rotated by rotation of said ball about either of two orthogonal axes;

process circuitry, disposed within said device housing, coupled to said sensing components for outputting electrical signals, coupleable to a host computer, containing position coordinate information representing rotation of said ball;

means for coupling said information representing rotation of said ball from said device to said computer;

at least a first user-operable switch, coupled to said process circuitry and operable from said first surface of said housing;

at least a second user-operable switch, coupled to said process circuitry and operable from said second surface of said housing; and sense switch means, coupled to said housing and to said at least first user-operable switch and to said at least second user-operable switch, for detecting which of said first and second surfaces is oriented uppermost and for decoupling a chosen one of said at least first user-operable switch and said at least second user-operable switch from said process circuitry as a function of orientation of said housing;

wherein when said first surface is oriented uppermost, said device is useable as a trackball even when said device is retained within said cavity, and said at least second user-operable switch is decoupled from said process circuitry; and wherein when said second surface is oriented uppermost, said device is usable as a mouse, and said at least first user-operable switch is decoupled from said process circuitry.

* * * * *